US010642845B2

(12) United States Patent
Hornkvist et al.

(10) Patent No.: US 10,642,845 B2
(45) Date of Patent: May 5, 2020

(54) MULTI-DOMAIN SEARCH ON A COMPUTING DEVICE

(71) Applicant: Apple Inc., Cupertino, CA (US)

(72) Inventors: John M. Hornkvist, Cupertino, CA (US); Gaurav Kapoor, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 14/502,881

(22) Filed: Sep. 30, 2014

(65) Prior Publication Data

US 2015/0347594 A1 Dec. 3, 2015

Related U.S. Application Data

(60) Provisional application No. 62/005,985, filed on May 30, 2014.

(51) Int. Cl.
| | |
|---|---|
| *G06F 16/30* | (2019.01) |
| *G06F 16/2457* | (2019.01) |
| *G06F 16/9535* | (2019.01) |
| *G06F 16/9537* | (2019.01) |
| *G06N 20/00* | (2019.01) |

(52) U.S. Cl.
CPC ...... *G06F 16/2457* (2019.01); *G06F 16/9535* (2019.01); *G06F 16/9537* (2019.01); *G06N 20/00* (2019.01)

(58) Field of Classification Search
CPC .................. G06F 17/20867; G06F 17/3087
USPC ........................................................ 707/728
See application file for complete search history.

(56) References Cited

U.S. PATENT DOCUMENTS

| | | |
|---|---|---|
| 6,775,664 B2 | 8/2004 | Lang et al. |
| 8,359,319 B2 | 1/2013 | Pendse |
| 2003/0131100 A1 | 7/2003 | Godon et al. |

(Continued)

FOREIGN PATENT DOCUMENTS

| | | |
|---|---|---|
| EP | 1 647 903 | 4/2006 |
| EP | 1647903 A1 | 4/2006 |

OTHER PUBLICATIONS

International Search Report dated Jul. 28, 2015 for PCT/US2015/030035, filed May 8, 2015, 3 pages.

(Continued)

*Primary Examiner* — Hosain T Alam
*Assistant Examiner* — Robert F May
(74) *Attorney, Agent, or Firm* — Womble Bond Dickinson (US) LLP (57) ABSTRACT

Systems and methods are disclosed for improving search results returned to a user from one or more domains, utilizing query features learned locally on the user's device. One or more domains can inform a computing device of one or more features related to a search query upon which to the computing device can apply local learning. A local search system can include a local database, a local search history and feedback history database, and a local learning system to identify features about query terms. The features can be learned from the user's interaction with both local search results and remote search results, without sending the user interaction information or other user identification information to a remote search engine. A locally learned feature can be used to extend a query, bias a query term, or filter query results.

22 Claims, 8 Drawing Sheets

(56) References Cited

U.S. PATENT DOCUMENTS

| | | |
|---|---|---|
| 2003/0217052 A1 | 11/2003 | Rubenczyk et al. |
| 2005/0149500 A1 | 7/2005 | Mamaros |
| 2005/0283473 A1 | 12/2005 | Rousso et al. |
| 2006/0074883 A1* | 4/2006 | Teevan ................ G06F 16/9535 |
| 2007/0143260 A1 | 6/2007 | Markov et al. |
| 2007/0185844 A1 | 8/2007 | Schachter |
| 2008/0005313 A1 | 1/2008 | Flake et al. |
| 2009/0024546 A1 | 1/2009 | Ficcaglia et al. |
| 2009/0063448 A1* | 3/2009 | DePue ................... G06F 16/951 |
| 2009/0063475 A1* | 3/2009 | Pendse ................ G06F 21/6245 |
| 2010/0036829 A1* | 2/2010 | Leyba ................ G06F 16/3344 707/739 |
| 2010/0287150 A1* | 11/2010 | Downum .............. G06F 16/951 707/706 |
| 2011/0010367 A1 | 1/2011 | Jockish et al. |
| 2013/0166543 A1* | 6/2013 | MacDonald ........ G06F 16/9535 707/723 |
| 2013/0246383 A1 | 9/2013 | White et al. |
| 2013/0254191 A1* | 9/2013 | He ....................... G06K 9/4676 707/728 |
| 2014/0307878 A1* | 10/2014 | Osborne .............. G10H 1/0008 381/56 |
| 2015/0347519 A1 | 12/2015 | Hornkvist et al. |

OTHER PUBLICATIONS

Written Opinion of the International Searching Authority dated Jul. 28, 2015 for PCT/US2015/030035, filed May 8, 2015 6 pages.

International Preliminary Report on Patentability dated Dec. 15, 2016 for PCT/US2015/030035, filed May 8, 2015, 13 pages.

PCT International Search Report for PCT/US2016/023284, dated Dec. 1, 2016, 3 pages.

PCT Written Opinion of the International Search Authority, dated Dec. 1, 2016, 6 pages.

PCT International Preliminary Report on Patentability Chapter 1, dated Nov. 28, 2017, 7 pages.

U.S. Appl. No. 14/721,945, filed May 26, 2015, Published as US 2015/0347519.

* cited by examiner

MULTI-DOMAIN SEARCH ON A COMPUTING DEVICE

RELATED APPLICATIONS

The present U.S. patent application claims priority under 35 U.S.C. § 119(e) to the following U.S. patent applications, each of which is incorporated herein by reference to the extent they are consistent with this disclosure:

(1) Application No. 62/005,985 (Docket No. 4860P23595Z), filed May 30, 2014 entitled, "MULTI-DOMAIN SEARCH ON A COMPUTING DEVICE;"

(2) Application No. 62/005,996 (Docket No. 4860P22924Z), filed May 30, 2014, entitled "MULTI-DOMAIN QUERY COMPLETION;"

(3) Application No. 62/006,000 (Docket No. 4860P23537Z), filed May 30, 2014, entitled "USE OF USER FEEDBACK IN A CITATION SEARCH INDEX;" and (4) Application No. 62/006,001 (Docket No. 4860P23848Z), filed May 30, 2014, entitled "FEDERATED SEARCH."

TECHNICAL FIELD

This disclosure relates to the field of computer-implemented searching, and in particular, in one embodiment to improving search results obtained from one or more domains utilizing local learning on a computing device.

BACKGROUND

A user of a computing system, entering a query into a search engine, wants to receive query results that are relevant to the user. Whether the results returned by the search engine are relevant to the particular user entering the query is a subjective view of the particular user entering the query. Therefore, the more information that the search engine can gather about the particular user, the more likely it is that the search engine will return results that are relevant to the particular user. However, gathering information about particulars users raises privacy concerns.

SUMMARY OF THE DESCRIPTION

Embodiments are described for improving search results returned to a user from a local database of private information and results returned from one or more search domains, utilizing query and results features learned locally on the user's computing device. In one embodiment, one or more search domains can inform a computing device of one or more features related to a search query, upon which the computing device can apply local learning.

In one embodiment, a computing device can learn one or more features related to a search query using information obtained from the computing device. Information obtained from, and by, the computing device can be used locally on the computing device to train a machine learning algorithm to learn a feature related to a search query or a feature related to the results returned from the search query. The feature can be sent to a remote search engine to return more relevant, personalized results for the query, without violating the privacy of a user of the device. In one embodiment, the feature is used to extend the query. In an embodiment, the feature is used to bias a term of the query. The feature can also be used to filter results returned from the search query. Results returned from the query can be local results, remote search engine results, or both.

In an example, a user of a computing device may subscribe to a news, or RSS, feed that pushes daily information about sports scores to the computing device. The only information that the news or RSS feed knows about the subscribing user is that the user is interested in sports scores. The user can query the information received by the computing device, from the RSS feed, for "football scores" using a local query interface on the computing device. To an American user, football means American football as played by, for example, the Dallas Cowboys. To a European or South American user, football often refers to what Americans call soccer. Thus, the distinction of "soccer" v. "football," with reference to the query term "football," can be a feature related to a search query that the computing device can train upon. If the user of the computing device interacts with local results for soccer scores, a local predictor for the news or RSS feed can learn that when the user of this device queries for football scores, this user means soccer scores.

In one embodiment, a remote search engine can learn the feature "football v. soccer." But, while the remote search engine can learn that a clear distinction exists between American football and soccer, the remote search engine does not know whether a particular user querying for football scores is interested in results about American football or soccer. Once the remote search engine learns of the distinction, the next time the remote search service receives a query about football scores, the remote search engine can return both American football scores and soccer scores, and also send a feature to the querying computing device to train upon so that the computing device can learn whether the particular user of the computing device is interested in American football scores or soccer scores.

In one embodiment, after the local client learns on the feature utilizing information that is private to the computing device, the next time that a user of the computing device queries a remote search service for football scores, the computing device can send a bias for the feature to the remote search service along with the query. For example, the bias can indicate whether this particular user is interested in American football or soccer.

In an embodiment, the computing device can learn on a feature using statistical analysis method of one of: linear regression, Bayes classification, or Naive Bayes classification.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for using locally available information on a computing device to learn query and results features that improve both local and remote search results for a user of the computing device, without disclosing private information about the user to a remote search engine.

Figure 1:
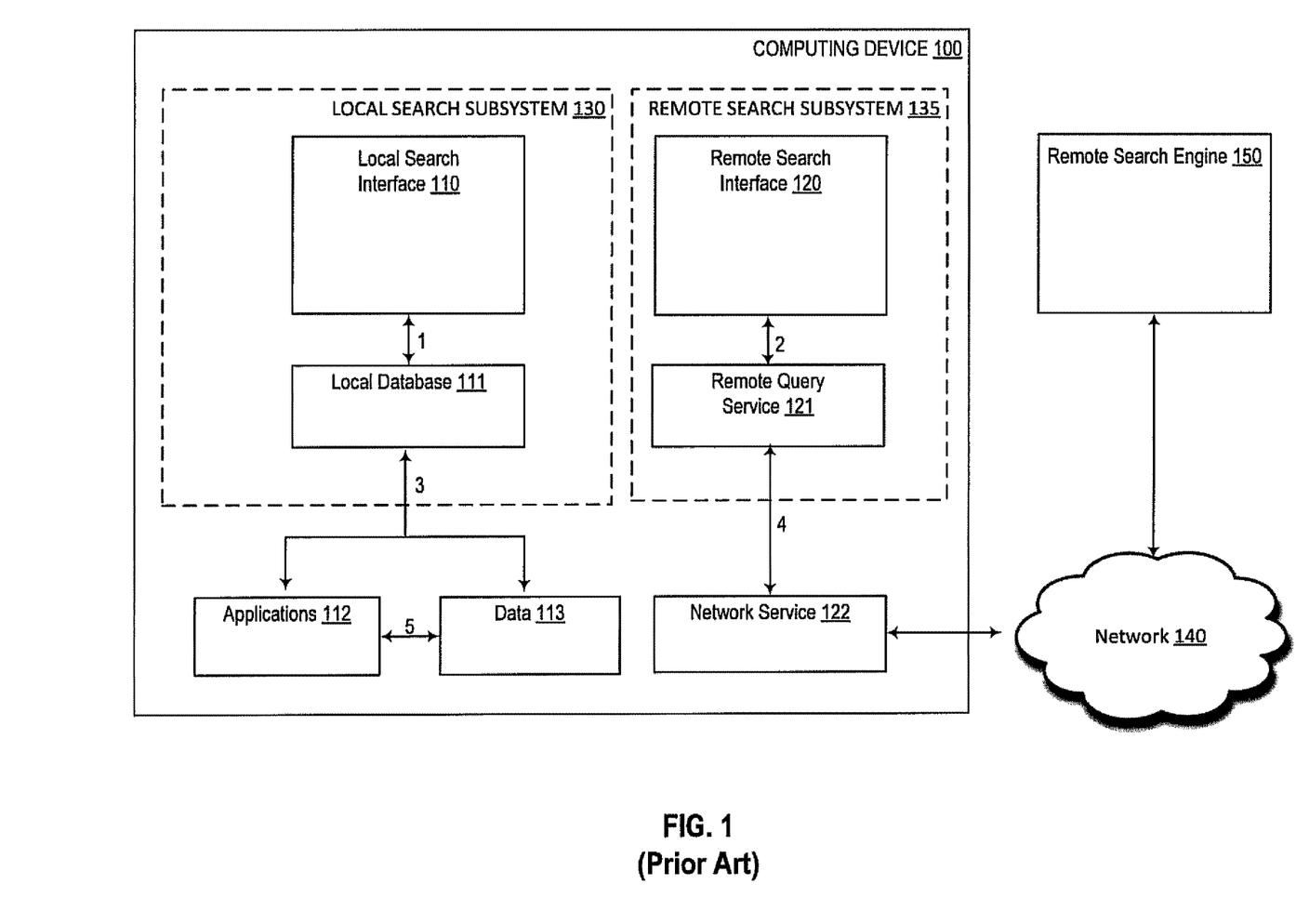
FIG. 1 illustrates, in block diagram form, a local search subsystem and a remote search subsystem on a computing device as is known in the prior art.

FIG. 1 illustrates a block diagram of a local search subsystem 130 and a remote search subsystem 135 on a computing device 100, as is known in the prior art. The local search subsystem 130 can include a local search interface 110 in communication 1 with a local database 111 of searchable information.

The local database 111 indexes local information on the computing device 100 for searching using the local search interface 110. Local information is private to a computing device 100 and is not shared with the remote search subsystem 135. Local information can include data, metadata, and other information about applications 112 and data 113 on the computing device 100.

The local database 111, applications 112 and data 113 are not accessible by the remote search subsystem 135. Queries entered into the local search interface 110, local results returned from the local query, and a user's interaction with the local results returned from the local query are not shared with, or accessible by, the remote search subsystem 135.

The local search interface 110 can communicate with the local database 111 via communication interface 1. The local database can communication with applications 112 and data 113 via communication interface 3.

A remote search subsystem 135 can include a remote search interface 120 and a remote query service 121. The remote query service 121 can send a query to, and return results from, a remote search engine 150 via network service 122 and network 140. The remote results are not made available to the local search subsystem 130.

The remote search interface 120 can communicate with the remote query service 121 via interface 2. The remote query service 121 can communicate with the network service 122 via interface 4.

Figure 2:
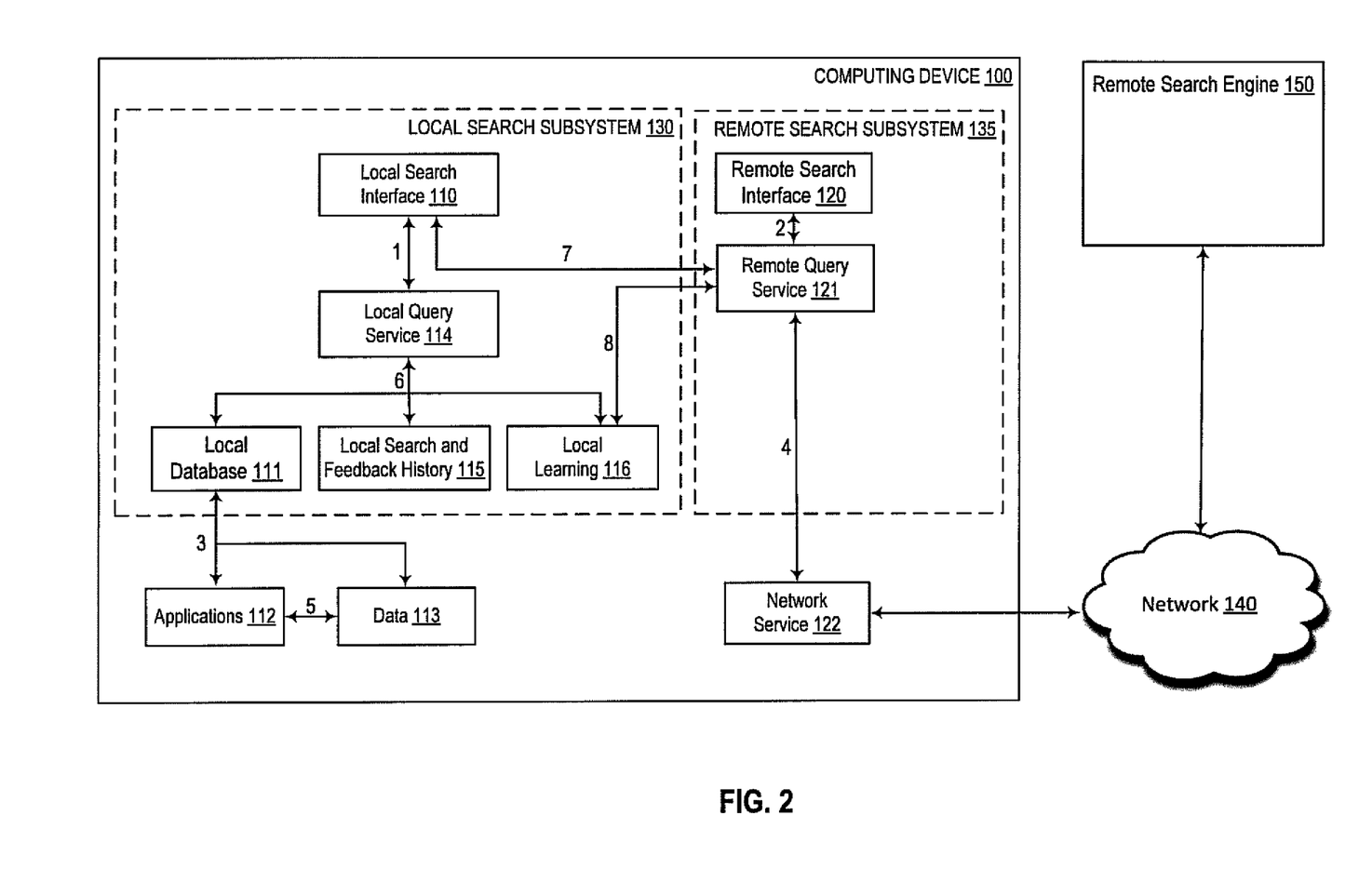
FIG. 2 illustrates, in block diagram form, a local search subsystem having local learning capability that can be used to improve the results returned from a remote search application on a computing device.

FIG. 2 illustrates, in block diagram form, a local search subsystem 130 having local learning system 116 that can be used to improve the search results returned from both local searches and searches of remote search engine 150, without exposing private information. In one embodiment, the local learning system 116 can be reset so that learning is flushed.

The local search subsystem 130 can include a local search interface 110 and a local database 111 of data and metadata about applications 112 and data 113 on computing device 100. Local database 111 can include local information about data sources such as a contacts database stored on the client, titles of documents or words in documents stored on the computing device, titles of applications and data and metadata associated with applications on the computing device, such as emails, instant messages, spreadsheets, presentations, databases, music files, pictures, movies, and other data that is local to a computing device. In an embodiment, local database 111 can including information about data sources stored in a user's Cloud storage. Applications 112 can include a calculator program, a dictionary, a messaging program, an email application, a calendar, a phone, a camera, a word processor, a spreadsheet application, a presentation application, a contacts management application, a map application, a music, video, or media player, local and remote search applications, and other software applications.

A query can be generated using the local search interface 110 and query results can be returned from the local database 111, via communication interface 1, and displayed in the local search interface 110. The local search subsystem 130 additionally can have a local query service 114, a local search and feedback history 115, and a local learning system 116. The local query service 114 can receive a query from local search interface 110. In one embodiment, local search interface 110 can also pass the query to remote query server 121, via communication interface 7, so that local search interface 110 receives search results from both the local database 111 and from remote search engine 150. Local query service 114 can remove redundant white space, remove high frequency-low relevance query terms, such as "the" and "a", and package the query into a form that is usable by the local database 111. Remote query service 121 can perform analogous functionality for the remote search engine 150. In an embodiment, local search interface 110 can pass the query to the remote query service 121, via communication interface 7, to obtain query results from remote search engine 150. In one embodiment, remote query service 121 can receive a query feature learned by local learning system 116 via communication interface 8. The feature can be used to extend the query and/or bias a query feature to the remote search engine 150. In an embodiment, remote query service 121 can pass a query feature, returned from the remote search engine 150, to the local learning system 116 for training on that feature via communication interface 8.

Local search and feedback history 115 can store the history of all search queries issued using the local query interface 110, including queries that are sent to the remote query service 121 via communication interface 7. Local search and feedback history 115 can also store user feedback associated with both local and remote results returned from a query. Feedback can include an indication of whether a user engaged with a result, e.g. by clicking-through on the result, how much time the user spent viewing the result, whether the result was the first result that the user interacted with, or other ordinal value, whether result was the only result that a user interacted with, and whether the user did not interact with a result, i.e. abandoned the result. The user feedback can be encoded and stored in association with the query that generated the results for which the feedback was obtained. In one embodiment, the local search and feedback history 115 can store a reference to one or more of the results returned by the query. Information stored in the local search and feedback history 115 is deemed private user information and is not available to, or accessible by, the remote search subsystem 135. In one embodiment, the local search and feedback history 115 can be flushed. In an embodiment, local search and feedback history 115 can be aged-out. The age-out timing can be analyzed so that stable long term trends are kept longer than search and feedback history showing no stable trend.

Local learning system 116 can analyze the local search and feedback history 115 to identify features upon which the local learning system 116 can train. Once a feature is identified, the local learning system 116 can generate a local predictor to train upon the feature. In one embodiment, a predictor is an instance of a software component that operates on one or more pieces of data. In one embodiment, the local predictors can train using a statistical classification method, such as regression, Bayes, or Naive Bayes. In an embodiment, a predictor can be specific to a particular category of results. Categories are discussed more fully below, with respect to operation 420 of FIG. 4: Blending, ranking, and presenting the results on a local device.

The computing device 100 can also include a remote search subsystem 135 that includes a remote search interface 120 and a remote query service 121. A remote search interface 120 can include a web browser such as Apple® Safari®, Mozilla®, or Firefox®. A query service 121 can perform intermediary processing on a query prior to passing the query to the network service 122 and on to the remote search engine 150 via network 140. Network service 122 passes can receive results back from the remote search engine 150 for display on the remote query interface 120 or on the local search interface 110. The remote query service 121 can be communicatively coupled to the network service 122 via communication interface 4.

A network 140 can include the Internet, an 802.11 wired or wireless network, a cellular network, a local area network, or any combination of these.

Interfaces 1-8 can be implemented using inter-process communication, shared memory, sockets, or an Application Programming Interface (API). APIs are described in detail, below, with reference to FIG. 7.

Figure 3:
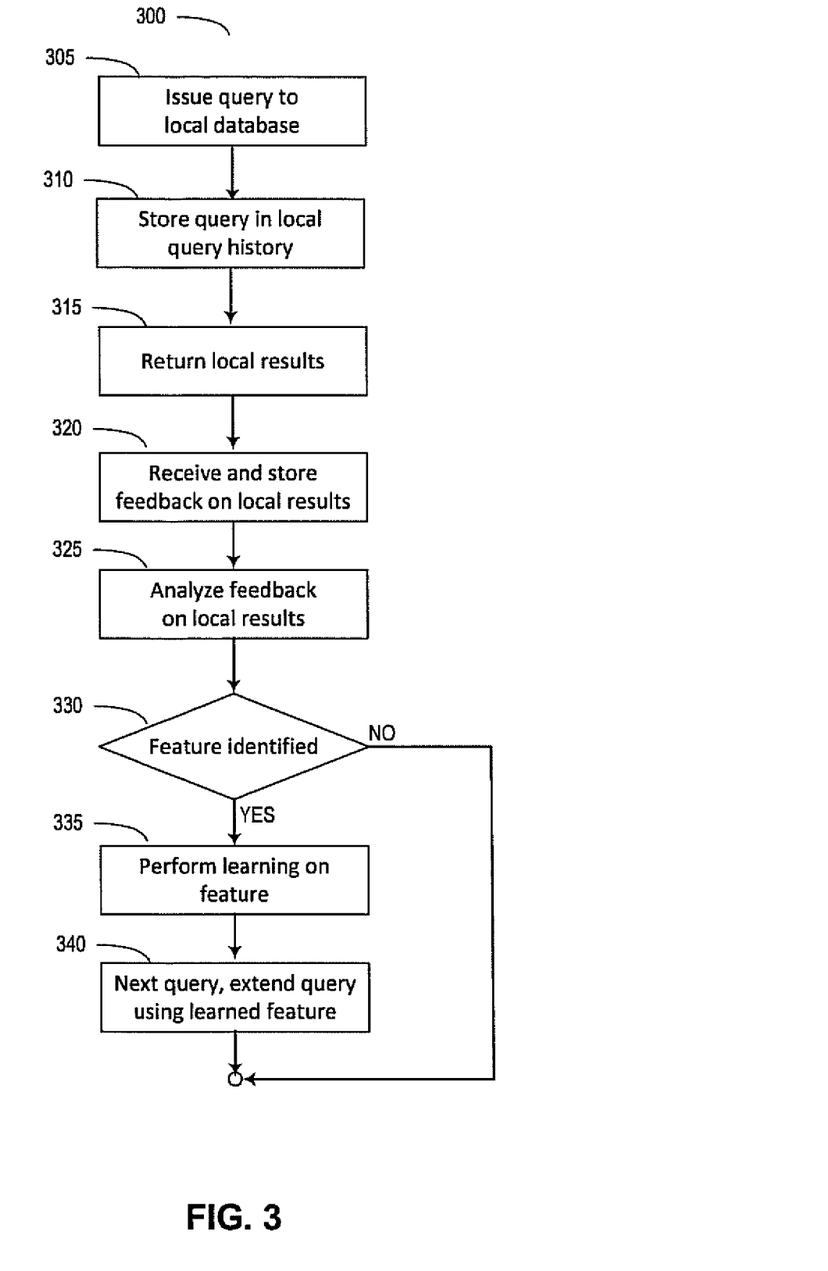
FIG. 3 illustrates, in block diagram form, a method of locally learning a query feature utilizing local search queries, local results and local feedback based on the local results.

FIG. 3 illustrates, in block diagram form, a method 300 of locally learning a query and results feature utilizing local search queries, local search results and local feedback and search history 115 based on the local search results.

In operation 305, a user can issue a query utilizing the local query interface 110.

In operation 310, the local query can be stored in the local search history and feedback history 115.

In operation 315, local results can be returned from the local database 111 to the local search interface 110 for display to the user. Local database 111 indexes data and metadata 113 generated or processed by one or more applications 112, such as documents, images, music, audio, video, calculator results, contacts, queries, filenames, file metadata and other data generated by applications 112 or associated with data 113. In an embodiment, the local database may not return any local results to a query for one or more applications 112. For example, if a query for "ham" is entered into the local search interface 110 in operation 305, then local database 111 may return a result from a dictionary application 112, from documents 113 containing the word "ham," and a contact having the word "ham," such as "Cunningham," but not return a result for a calculator application 112 because the calculator application has no data or metadata 113 related to "ham." However, if a query for "π" is entered in the local search interface 110 in operation 305, then local database 111 may return results related to the calculator application 112, such as "3.141592654," the Greek symbol "π," or formulae that utilize the value of Pi, such as the circumference or area of a circle, or the volume of a sphere or cylinder. Similarly, if a query is entered in the local search interface 110 for "Lake Tahoe pictures" in operation 305, then the local database 111 may return results for pictures of Lake Tahoe that may have been generated by a camera application 112, downloaded from an email application 112, and/or documents 113 that contain pictures of Lake Tahoe generated by a word processing application 112. In an embodiment, local results can be categorized for display according to the application 112 that acquired or generated the local results. For example, pictures of Lake Tahoe that were downloaded from an email application 112 may be categorized together for display, pictures of Lake Tahoe that were generated by the camera application 112 may be categorized together for display, and pictures of Lake Tahoe that are incorporated into one or more documents generated by a word processing application 112 may be categorized together for display.

In operation 320, the user can interact with one or more of the displayed local results. The interaction with, or non-interaction with, the results can be stored as feedback on the local results in the local search and feedback history 115.

In operation 325, the local leaning system 116 can analyze the local search and local feedback history 115 to determine one or more features related to the query.

In operation 330, if the local learning system 116 has identified a new feature, then in operation 335 a new local predictor can be generated for the feature and the local learning system 116 can train on the identified feature.

In operation 340, the next time that a query is issued for which the feature is relevant to the query, the feature can be used to do one or more of: extend the query, bias a term of the query, or filter the results returned from the query.

Figure 4:
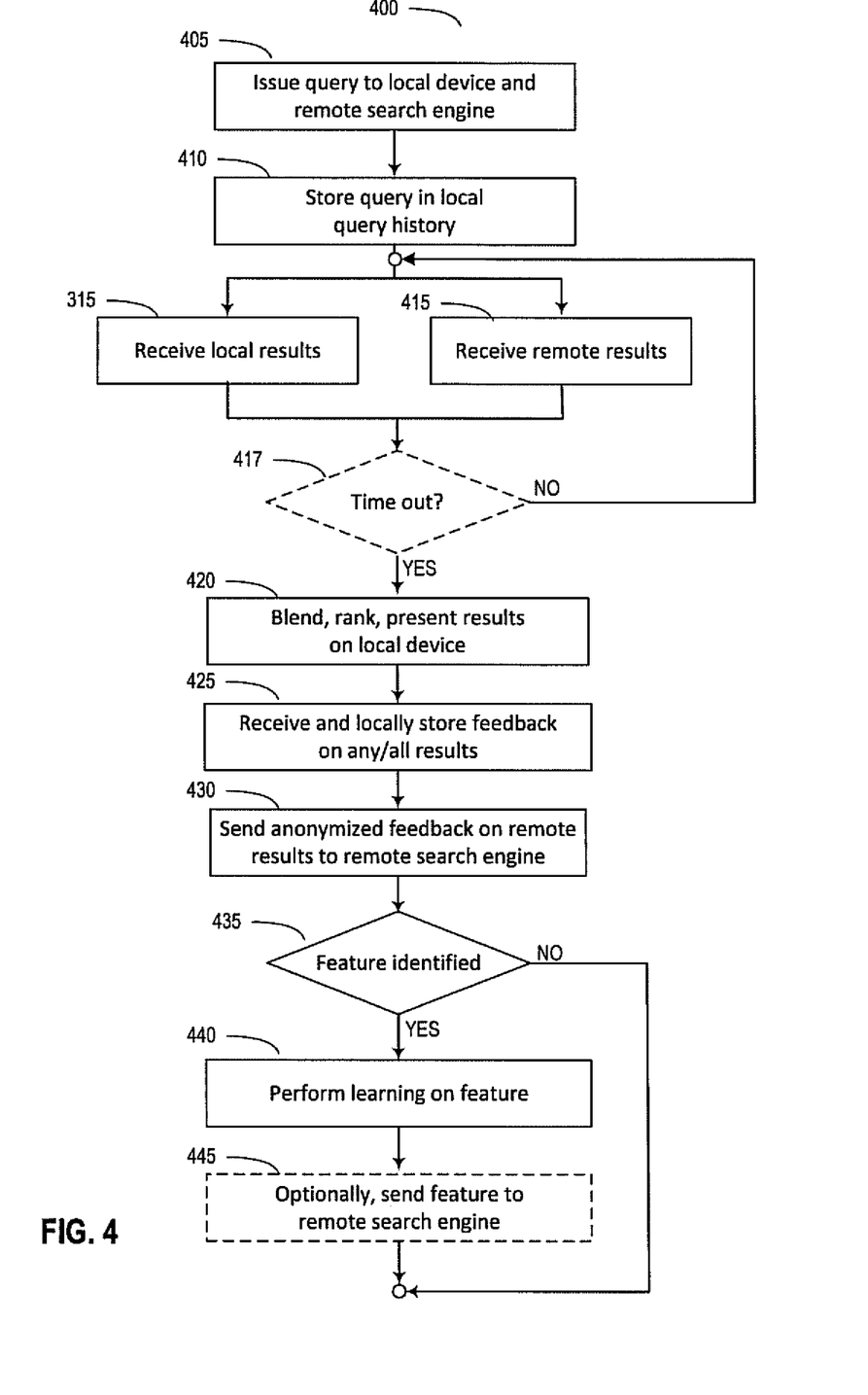
FIG. 4 illustrates, in block diagram form, a method of locally learning a query feature utilizing search results returned from both local search queries and remote search queries, and local feedback on both local and remote search query results.

FIG. 4 illustrates, in block diagram form, a method 400 of locally learning a query feature utilizing search results returned from both local search queries and remote search queries, and local feedback on both local and remote search query results.

In operation 405, a user issues a query using the local search interface 110. As described above, the local search interface 110 can pass the query to one, or both, of the local database 111 and the remote search engine 150 via local query service 114 or remote query service 121, respectively.

In operation 410, the query can be stored in the local search history and feedback history 115.

As shown in operations 315 and 415, local results from local database 111 and remote results from remote search engine 150, respectively, may return at the same time, or asynchronously. In one embodiment, a time 417 can be set to determine when to display the results that have been received up to the expiration of the timer. In an embodiment, additional results can be received after the expiration of the timer. The time value can be configured locally on the computing device 100, or on the remote search engine 150, or on both such that local and remote search results are displayed at different times.

In operation 420, the local search results and the remote results can be blended and ranked, then presented to the user on the local search interface 110. In one embodiment, if the local learning system 116 determines that a calculator result is highly relevant, then it is ranked toward the top. A calculator result may be highly relevant if the user issued a query from within the calculator application and the query "looks" like a computation or a unit conversion. In an embodiment, local results 315 matching the query can be ranked higher than remote search engine results 415. In an embodiment, results can be ranked and/or filtered utilizing a previously learned feature. In an embodiment, local results 315 can be presented in categories, such as emails, contacts, iTunes, movies, Tweets, text messages, documents, images, spreadsheets, et al. and ordered within each category. For example, local results can be presented within categories, ordered by the most recently created, modified, accessed, or viewed local results 315 being displayed first in each category. In another embodiment, categories can be ordered by context. For example, if a user issues a local query from within his music player application 112, then results returned from the local database 111 that are related to the music player application 112 can be categorized and displayed before other local results. In yet another embodiment, categories can be ordered by the frequency that a user interacts with results from a category. For example, if a user rarely interacts with email results, then email results can be categorized and displayed lower than other local results. In an embodiment, the display order of local categories is fixed. This can facilitate easy identification for a user, since local result categories rarely change. In another embodiment, categories can be displayed according to a relevance ranking order, and the results within each category can be displayed by relevance ranking order.

In one embodiment, results 415 returned from the remote search engine can include a score based on at least one of: whether the a query term is equal to the title of the result, whether a query term is within the title of the result, whether a query term is within the body of the result, or based on the term frequency-inverse document frequency of one or more query terms. Additionally, remote search engine search results 415 may have a query-dependent engagement scores indicating whether other users that have issued this query have engaged with the result, indicating that users found the result relevant to the query. A result may also have a query-independent engagement score indicating whether other users have engaged with the result, meaning that other users found the result relevant regardless of the query used to retrieve the result. A result may also have a "top-hit" score, indicating that so many users found the result to be relevant that the result should be ranked toward the top of a results set. In one embodiment, the local learning system 116 can generate, for each result, a probability that this user of this computing device 100 will likely also find the result relevant.

In operation 425, the local search interface can receive feedback from the user indicating whether a user has engaged with a result, and if so, how long has the user engaged with the result, or whether the user has abandoned the result. The user feedback can be collected and stored in the local search and feedback history 115, regardless of whether a result is a local database result or a remote search engine result. The query can also be stored in the local search and feedback history 115. In one embodiment, the query and the feedback history can be associated with a particular user of the computing device 100. In an embodiment, the query, feedback history 115, and association with a particular user, can be used by the local learning 116 to generate a social graph for the particular user.

For example, suppose that a particular user, Bob, issues one or more queries to the local device and remote search engine in operation 405 for "Bill" and "Steven." Local results 315 may be received from, e.g., a contacts application 112 and remote results 415 may be returned for, e.g., LinkedIn® profiles of persons named Bill and Steven, as well as other remote results 415. After the results are blended, ranked, and presented to the user Bob in operation 420, then the search query and feedback history 115 of Bob's interaction with the local results 315, the remote results 415, or both, can be stored in operation 425. From this stored search history and feedback 115, a social graph can be generated by local learning system 116 from Bob's interaction with local results 315, remote results 415, or both.

In an embodiment, local learning on remote results can also be used to filter out results that the user has repeatedly been presented, but the user has not interacted with. For example, a user may issue a query to the local device and remote search engine 150 for a current political topic in operation 405. The remote results 415 returned in response to the query may include results from The Huffington Post® and Fox News®. In operation 425, the learning system 116 can learn from the locally stored feedback on any/all results that the user rarely, or never, interacts with "Fox News®" results. The learning system 116 can determine a new feature to train upon, "News Source," and learn to exclude Fox News® results from future remote results when blending, ranking, and presenting results on the local device in operation 420.

In operation 430, feedback history of only the remote search engine results can be returned to the remote search engine 150. The feedback history can be anonymized so that a particular user and/or machine is not identified in the information sent to the remote search engine 150. In one embodiment, the query associated with the anonymized feedback is not sent to the remote search engine, to preserve user privacy.

In operation 435, local learning system 116 can analyze the local search and feedback history 115 to determine whether a feature can be identified from the results and the feedback on the results. The local learning system 116 can utilize the feedback on all of the results for the query, both local and remote, in determining whether a feature can be identified.

If a feature was identified in operation 435, then in operation 440 the local learning system 116 can generate a local predictor on the feature and train upon that feature.

In operation 445 the local learning system 116 can optionally send a feature vector to the remote search engine based upon a feature identified by the local learning system 116. Using the news sources example again, a user may query to the local device and remote search engine 150 for a current political topic in operation 405. The remote results 415 returned in response to the query may include results from The Huffington Post® and Fox News®. The remote search engine 150 may have returned results for Fox News® as the top rated results based upon interaction by many users of the remote search engine 150. However, the local feedback history for this particular user may indicate that this particular user does not interact with Fox News® results, contrary to the top rated ranking of Fox News® results by the remote search engine 150. The local learning system 116 can identify that this user does not interact with Fox News® results, even though the remote search engine ranks the Fox News® results as top rated, as a feature in operation 435 and can perform local learning on the feature in operation 440, and optionally send the feature back to the remote search engine 150 in operation 445.

Figure 5:
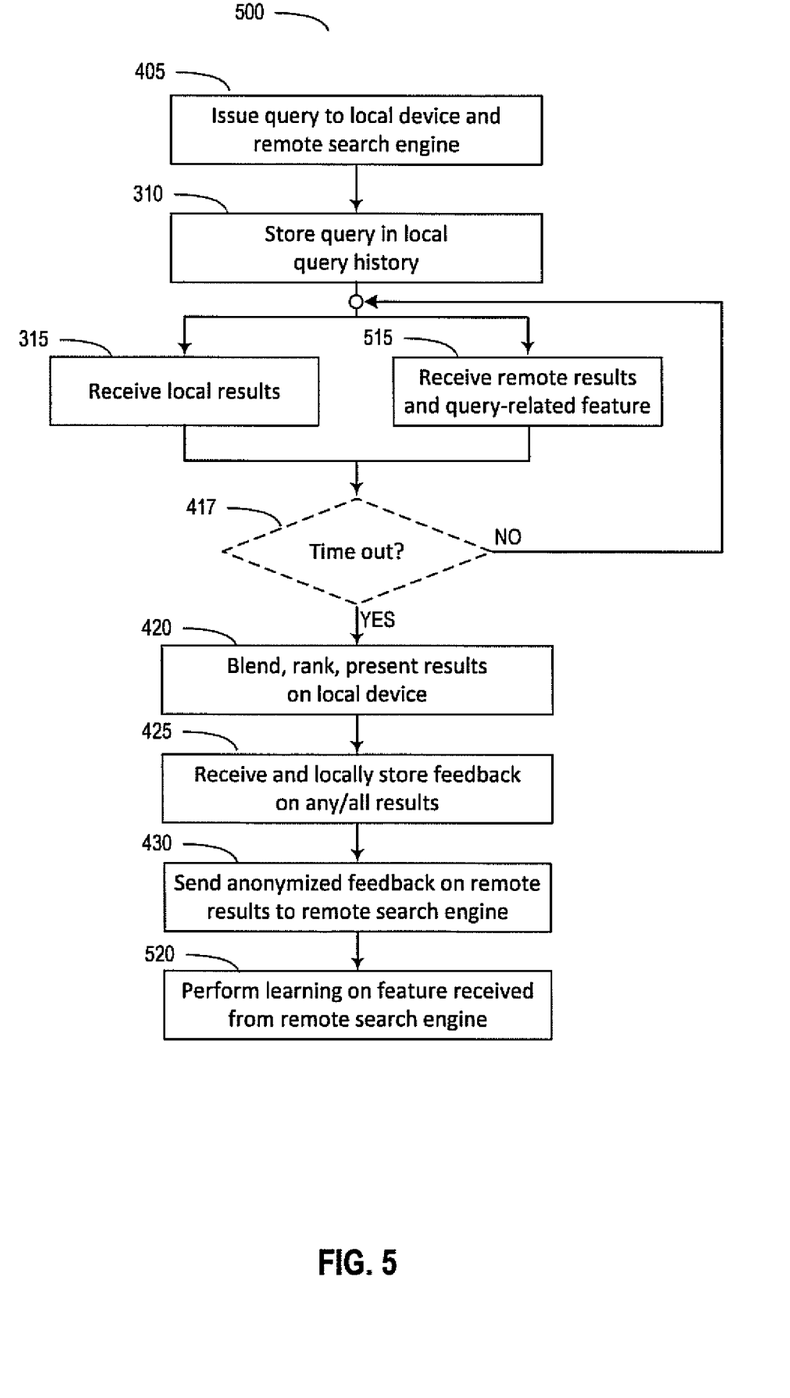
FIG. 5 illustrates, in block diagram form, a method of locally learning a query feature passed to a local device by a remote service in response to a query sent to the remote service.

FIG. 5 illustrates, in block diagram form, a method 500 of locally learning a query feature passed to a computing device 100 by a remote search engine 150 in response to a query sent by the computing device 100 to the remote search engine 150. Many of the operations of method 500 have been previously described above.

In operation 405, a user can issue a query using the local search interface 110. As described above, the local search interface 110 can pass the query to one, or both, of the local database 111 and the remote search engine 150.

In operation 310, the local query can be stored in the local search history and feedback history 115.

In operation 315, the computing device 100 can receive local results returned from the local database 111 in response to the query. Local results can be received independently of, and asynchronous to, search results returned from the remote search engine 150.

In operation 515, the computing device 100 can receive results returned from the remote search engine 150 in response to the query. In operation 515, the remote search engine can also return a feature related to the query and the results, for the local learning system 116 to train on.

In an embodiment, a timer 417 can be set to determine when to display the results that have been received up to the expiration of the timer. In an embodiment, additional results can be received after the expiration of the timer. The time value of the timer can be configured locally on the computing device 100, or on the remote search engine 150, or on both such that local and remote search results are displayed at different times.

In operation 420, the local results and the remote results can be blended and ranked as described in operation 420, above, with reference to FIG. 4.

In operation 425, the local search interface can receive feedback from the user indicating whether a user has engaged with a result, and if so, how long has the user engaged with the result, or whether the user has abandoned the result. The user feedback can be collected and stored in the local search and feedback history 115, regardless of whether a result is a local database result or a remote search engine result. The query can also be stored in the local search and feedback history 115. In one embodiment, the query and the feedback history can be associated with a particular user of the computing device 100.

In operation 430, feedback history of only the remote search engine results can be returned to the remote search engine 150. The feedback history can be anonymized so that a particular user and/or machine is not identified in the information sent to the remote search engine 150. In one embodiment, the query associated with the anonymized feedback is not sent to the remote search engine, to preserve user privacy.

In operation 520, the local learning system 116 can generate a local predictor on the feature that was received from the remote search engine 150 in operation 515 and train upon that feature. The local learning system 116 can utilize local feedback and search history 115 to determine how a particular user interacts with both local and remote search results for the feature received from the remote search engine 150. The local learning system 116 can track whether a feature is determined by the local learning system 116 or whether a feature is received from a remote search engine 150 for learning by the local learning system 116. In embodiments that send feature information to the remote search engine 150, such as in operation 630 of FIG. 6, below, feature information can be anonymized before sending the feature information to the remote search engine 150 the privacy of the particular user.

Figure 6:
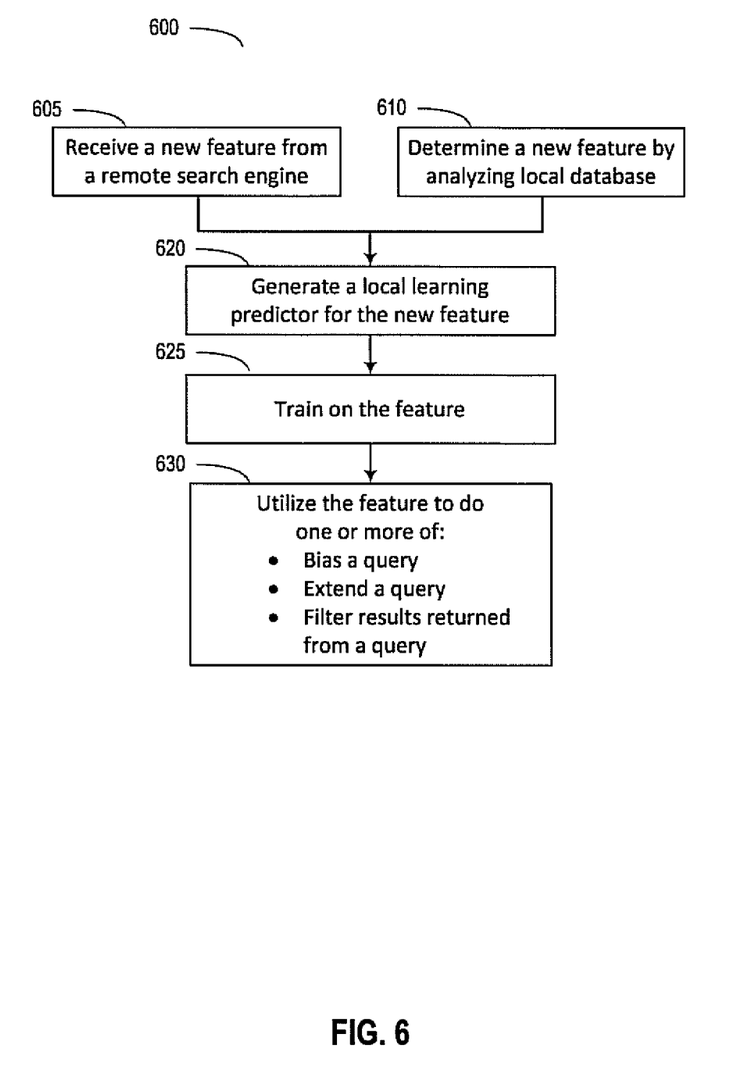
FIG. 6 illustrates, in block diagram form, a method of receiving or determining a new feature, locally training on the feature, and utilizing the feature.

FIG. 6 illustrates, in block diagram form, a method 600 of receiving or determining a new feature, locally training on the feature, and utilizing the feature.

In operation 605, remote search engine 150 can return to computing device 100 a new feature that the computing device is to training locally upon. The remote search engine 150 can return the feature to the computing device 100 in conjunction with results returned from a query by the computing device 100. In one embodiment, the feature can be returned to computing device independent of whether the query was generated from the local search interface 110 or the remote search interface 120. In one embodiment, the remote query server 121 can intercept the feature and pass the feature to the local learning system 116 via communication interface 8.

In operation 610, the method 600 can alternatively begin by the local learning system 116 determining a feature by analyzing the local search history and feedback history 115. A feature can be learned by analyzing the local search history and feedback history 115 in a variety of ways. A few examples are given below:

A user may issue a query for "football scores." The remote search engine 150 may return results for both football scores and soccer scores. The remote search engine 150 may have determined that the computing device 100 that sent the query was located at an IP address that is in the United States. Therefore the remote search engine prioritized American football scores, such as the Dallas Cowboys, as being the most relevant results. In many European and South American countries, football means soccer. Suppose the user that issued the query is interested in, and interacts with, the soccer results. The local learning system 116 can analyze the local search history and feedback history 115 to determine that the user did not interact with the higher-ranked American football scores. The local learning system 116 can then analyze the results and determine that the feature that football has at least two meanings and that the user of this computing device 100 has a preference for soccer over American football.

Using the football scores example again, upon receiving the results for football scores, the user may have wondered why he was receiving American football scores. In the local results returned from local database 111, there may be a dictionary entry for the word, "football." The user clicked on the dictionary entry for "football." In response, the local learning system 116 can determine a new feature that there are alternate definitions for football and that this user has a preference for soccer over American football.

In another example, suppose that a user enters the query, "Montana," and receives a local result from his address book, "Mary Montana," a local result from his dictionary, remote results for Joe Montana (American football legend), and the U.S. State of Montana. The user clicks on Mary Montana from his local address book almost every time that he queries for Montana. The local learning system 116 can determine a feature for Montana, and that this user has a preference for the contact record "Mary Montana."

In yet another example, a user issues a query for, "MG." The user has many pictures of British MG cars on his local computer and they are indexed in the local database 111. The remote search engine 150 may return results for the element, "Magnesium" (symbol Mg). The user may also have many songs on his computer by the band, "Booker T. and the MGs" and receive local results accordingly. The local learning system 116 can determine the disparity in these results and can determine a feature for "MG."

Once a feature has been received in operation 605, or determined in operation 610, then in operation 620 the local learning system 116 can generate a local predictor for the feature.

In operation 625, the local learning system 116 can use the local predictor to train on the feature, "MG," utilizing the local search history and feedback history 115. The local learning system 116 can also use the context of the computing device 100 to train upon a feature.

Using the MG example, above, if a user issued the query, MG, from inside a Calculator program, the local learning system 116 can utilize the context to learn that the user was most likely interested in the molecular weight of magnesium, or other property of magnesium, and train on MG accordingly. If the user issued the query from inside a picture viewing application, while viewing a picture of an MG car, the local learning system 116 can utilizing the context to learn that the user is most likely interested in British MG cars.

In operation 630, a feature learned by the local learning system 116, or a feature received from the remote search engine 150, can be utilized in several different ways. When issuing a new query for MG, e.g., the query can be extended utilizing a learned preference for MG (e.g. magnesium). In one embodiment, when issuing a new query for MG, e.g., the query can be biased in favor of results for magnesium. Local learning system 116 can compute a bias probability (learned preference) associated with each query feature and provide the bias to remote search engine 150 as a feature vector. In an embodiment, the feature vector can be sent to the remote search engine the next time that a user queries the remote search engine using a query term associated with the feature. In an embodiment, the feature can be used to filter the results returned from either, or both, the local database 111 or the remote search engine 150 to limit, the results returned to the query MG to, e.g., magnesium results.

Figure 7:
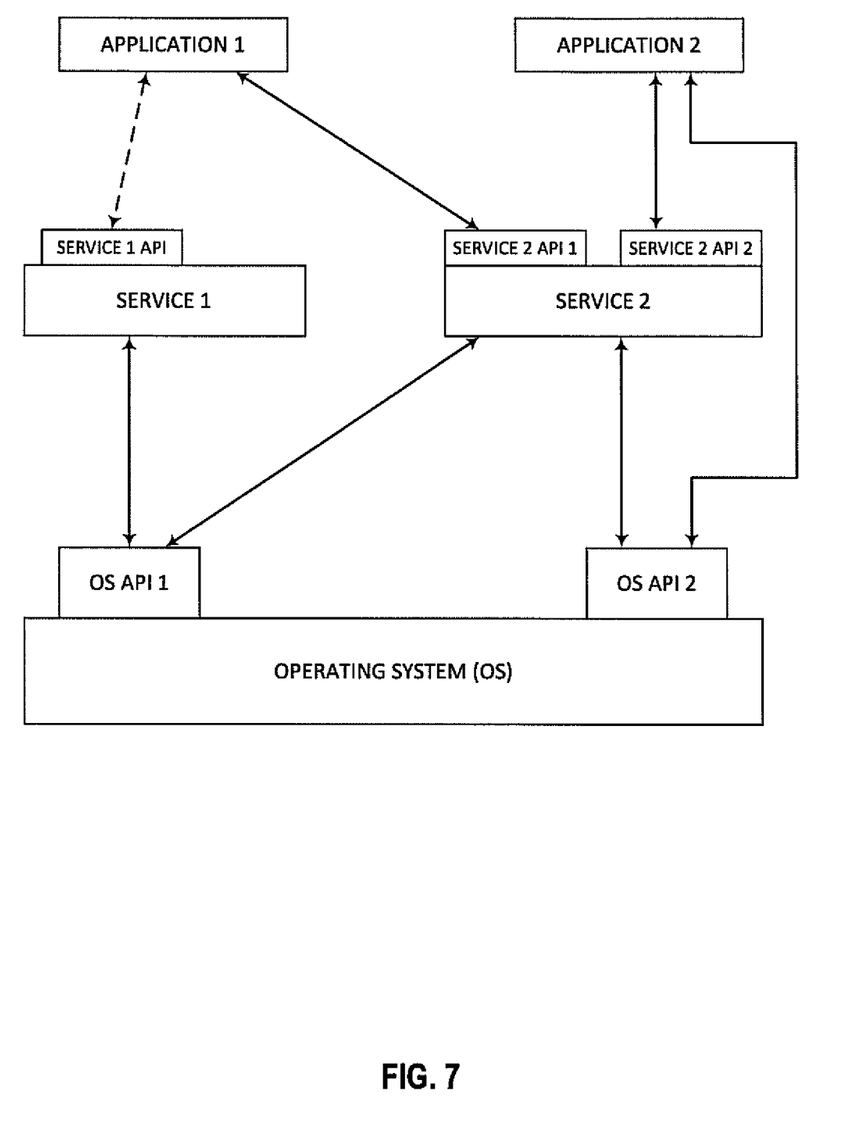
FIG. 7 illustrates an exemplary embodiment of a software stack usable in some embodiments of the invention.

In FIG. 7 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 8:
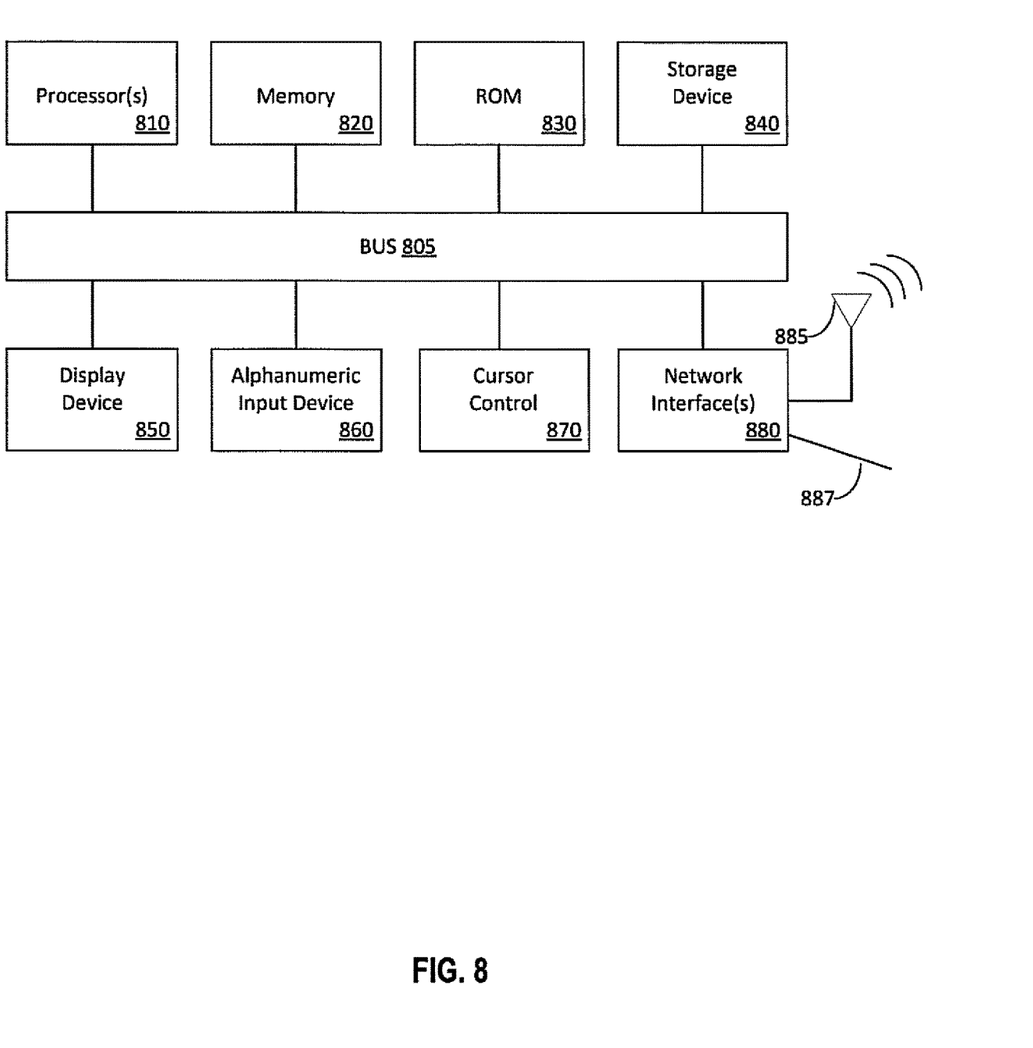
FIG. 8 is a block diagram of one embodiment of a computing system.

FIG. 8 is a block diagram of one embodiment of a computing system 800. The computing system illustrated in FIG. 8 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide the computing device and/or the server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) and/or other static storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a cathode ray tube (CRT) or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 870, such as a touchpad, a mouse, a trackball, or cursor direction keys to communicate direction information and command selections to processor(s) 810 and to control cursor movement on display 850.

Computing system 800 further may include one or more network interface(s) 880 to provide access to a network, such as a local area network. Network interface(s) 880 may include, for example, a wireless network interface having antenna 885, which may represent one or more antenna(e). Computing system 1200 can include multiple wireless network interfaces such as a combination of WiFi, Bluetooth and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
   transmitting, by a computing device of a user, to a remote search engine and to a local database, a search query;
   receiving, by the computing device, from the remote search engine and the local database, search results responsive to the search query;
   identifying, by a local learning system on the computing device, a feature related to the search query, using user interaction with the search results received from the local database, the remote search engine, or both, and wherein the user interaction with the search results is stored on the computing device of the user and kept private to the computing device of the user and is not shared with the remote search engine, wherein the feature comprises a distinction of multiple meanings of a term of the search query or a term in the search results;
   generating, on the computing device, a local predictor for the feature identified by the local learning system;
   training the local predictor on the computing device for the feature using information generated on, and private to, the computing device, wherein the trained local predictor indicates a learned user bias towards one of the multiple meanings of the term of the search query or the term of the search results;
   in response to the local learning system identifying the feature, the computing device transmitting a feature vector containing the locally identified feature to the remote search engine, wherein the feature vector is distinct from the search query, the feature vector does not contain an indication of bias towards one of the multiple meanings related to the identified feature, and the remote search engine is to generate and train a predictor for the remote search engine for the feature identified by the local learning system; and
   transmitting a second query to the remote search engine and local database, the second query having one or more terms related to the identified feature, and receiving second query results from the remote search engine and local database based on the multiple meanings related to the identified feature.

2. The method of claim 1, further comprising biasing a subsequent query to the remote search engine and the local database in accordance with the trained predictor.

3. The method of claim 1, wherein information obtained from the computing device comprises at least one of: a search query performed on the computing device of information on the computing device or feedback of interaction by a user of the computing device with results returned from a search query performed on the computing device of information stored on the computing device, wherein the feedback of interaction by the user of the computing device is not transmitted to the remote search engine.

4. The method of claim 3, wherein training comprises a statistical analysis of the information obtained from the computing device, wherein statistical analysis comprises one of: linear regression, Bayes classification, or Naive Bayes classification.

5. The method of claim 1, wherein information generated on the computing device comprises a context of the computing device at the time the search query was issued.

6. The method of claim 5, further comprising:
   wherein the context includes an application from which the search query was issued.

7. The method of claim 1, further comprising:
   anonymizing, by the computing device of the user, the user interaction history with the remote search engine results, such that a particular user and/or particular computing device of a particular user is not identified with the anonymized user interaction history; and
   transmitting the anonymized user interaction history with the remote search engine results to the remote search engine.

8. A non-transitory computer-readable medium programmed with executable instructions that, when executed by a processing system, perform a method, comprising:
   transmitting, by a computing device of a user, to a remote search engine and a local database, a search query;
   receiving, by the computing device, from the remote search engine and the local database, search results responsive to the search query;
   identifying, by a local learning system on the computing device, a feature related to the search query, using user interaction with the search results received from the local database, the remote search engine, or both, and wherein the user interaction with the search results is stored on the computing device of the user and kept private to the computing device of the user and is not shared with the remote search engine, wherein the feature comprises a distinction of multiple meanings of a term of the search query or a term in the search results;
   generating, on the computing device, a local predictor for the feature identified by the local learning system;
   training the local predictor for the feature on the computing device, using information generated on, and private to, the computing device, wherein the trained local predictor indicates a learned user bias towards one of the multiple meanings of the term of the search query or the term of the search results;
   in response to the local learning system identifying the feature, the computing device, transmitting a feature vector containing the locally identified feature to the remote search engine, wherein the feature vector is distinct from the search query, the feature vector does not contain an indication of bias towards one of the multiple meanings related to the identified feature and the remote search engine is to generate and train a predictor for the remote search engine for the feature identified by the local learning system; and
   transmitting a second query to the remote search engine and local database, the second query having one or more terms related to the identified feature, and receiving second query results from the remote search engine and local database based on the multiple meanings related to the identified feature.

9. The medium of claim 8, further comprising biasing a subsequent query to the remote search engine and the local database in accordance with the trained predictor.

10. The medium of claim 8, wherein information obtained on the computing device comprises at least one of: a search query performed on the computing device of information on the computing device or feedback of interaction by a user of the computing device with results returned from a search query performed on the computing device of information stored on the computing device, wherein the feedback of interaction by the user of the computing device is not transmitted to the remote search engine.

11. The medium of claim 10, wherein training comprises a statistical analysis of the information obtained from the computing device, wherein statistical analysis comprises one of: linear regression, Bayes classification, or Naive Bayes classification.

12. The medium of claim 8, wherein information generated on the computing device comprises a context of the computing device at the time the search query was issued.

13. The medium of claim 12, further comprising:
wherein the context includes an application from which the search query was issued.

14. The medium of claim 9, further comprising:
anonymizing, by the computing device of the user, user interaction history with the remote search engine results, such that a particular user and/or particular computing device of the particular user is not identified with the anonymized user interaction history; and
transmitting the anonymized user interaction history with the remote search engine results to the remote search engine.

15. A system of a user comprising:
a memory; and
a processing system programmed with executable instructions stored in the memory that, when executed by the processing system, perform a method, comprising:
transmitting, by the system, to a remote search engine and a local database, a search query;
receiving, by the system, from the remote search engine and the local database, search results responsive to the search query;
identifying, by a local learning system of the system of the user, a feature related to the query, using user interaction with the search results received from the local database, the remote search engine, or both, and wherein the user interaction with the search results is stored on the system of the user and kept private to the system of the user and is not shared with the remote search engine, wherein the feature comprises a distinction of multiple meanings of a term of the search query or a term in the search results;
generating, on the system, a local predictor for the feature identified by the local learning system;
training the local predictor for the feature on the system of the user, using information generated on, and private to, the system, wherein the trained local predictor indicates a learned user bias towards one of the multiple meanings of the term of the search query or the term of the search results;
in response to local learning system identifying the feature, the system of the user transmitting a feature vector containing the locally identified feature to the remote search engine, wherein the feature vector is distinct from the search query, the feature vector does not contain an indication of bias towards one of the multiple meanings related to the identified feature, and the remote search engine is to generate and train a predictor for the remote search engine for the feature identified by the local learning system; and
transmitting a second query to the remote search engine and local database, the second query having one or more terms related to the identified feature, and receiving second query results from the remote search engine and local database based on the multiple meanings related to the identified feature.

16. The system of claim 15, further comprising biasing a subsequent query to the remote search engine and the local database in accordance with the trained predictor.

17. The system of claim 15, wherein information obtained on the system comprises at least one of: a search query performed on the system of information on the system or feedback of interaction by a user of the system with results returned from a search query performed on the system of information stored on the system, wherein the feedback of interaction by the user of the system is not transmitted to the remote search engine.

18. The system of claim 17, wherein training comprises a statistical analysis of the information obtained from the system, wherein statistical analysis comprises one of: linear regression, Bayes classification, or Naive Bayes classification.

19. The system of claim 15, wherein information generated on the computing device comprises a context of the computing device at the time the search query was issued.

20. The system of claim 19, further comprising:
wherein the context includes an application from which the search query was issued.

21. The system of claim 16, further comprising:
anonymizing, by the system of the user, user interaction history with the remote search engine results, such that a particular user and/or particular computing device of the particular user is not identified with the anonymized user interaction history; and
transmitting the anonymized user interaction history with the remote search engine results to the remote search engine.

22. The method of claim 1, further comprising:
receiving, by the computing device, local search results responsive to the search query;
blending and ranking, by the computing device, the local search results with the remote search engine results; and
displaying the blended search results to a user on the computing device.

* * * * *